United States Patent
Myers

(10) Patent No.: US 7,609,642 B2
(45) Date of Patent: Oct. 27, 2009

(54) DETECTING NETWORK INTERFACES CAPABLE OF CHANNEL BONDING

(75) Inventor: Glenn W. Myers, Webster, MN (US)

(73) Assignee: Computer Associates Think, Inc,, Islandia, NY (US)

( * ) Notice: Subject to any disclaimer, the term of this patent is extended or adjusted under 35 U.S.C. 154(b) by 677 days.

(21) Appl. No.: 11/224,441

(22) Filed: Sep. 12, 2005

(65) Prior Publication Data

US 2007/0058655 A1    Mar. 15, 2007

(51) Int. Cl.
*H04L 12/26* (2006.01)
*H04L 12/28* (2006.01)
*H04L 12/56* (2006.01)
*G06F 15/177* (2006.01)

(52) U.S. Cl. .................. 370/242; 370/255; 370/400; 709/220

(58) Field of Classification Search ......... 370/241–253, 370/254–258, 351, 400–401; 709/220–222, 709/225, 227–229, 232, 235
See application file for complete search history.

(56) References Cited

U.S. PATENT DOCUMENTS 5,708,654 A * 1/1998 Arndt et al. ................. 370/242
6,249,820 B1 * 6/2001 Dobbins et al. ............. 709/238

FOREIGN PATENT DOCUMENTS

| EP | 000858189 A2 * | 8/1998 |
| EP | 0 863 646 A2 | 9/1998 |
| JP | 2004266546 | 9/2004 |
| WO | WO/2006/013511 A1 | 2/2006 |

OTHER PUBLICATIONS

PCT International Search Report and PCT Written Opinion from corresponding PCT Application No. PCT/US2006/035262, mailed Feb. 19, 2007, (14 pages).
IBM, "Load Balancing for Multiple Interfaces for Transmission Control Protocol/Internet Protocol for VM/MVS", IBM Technical Disclosure Bulletin, vol. 38, No. 9, Sep. 1995, XP 000540166, 3 pages.
Transmittal and International Preliminary Report on Patentability from corresponding Application Serial No. PCT/US2006/035262, mailed Mar. 27, 2008 (9 pages).

* cited by examiner

*Primary Examiner*—Chi H Pham
*Assistant Examiner*—Tri H Phan
(74) *Attorney, Agent, or Firm*—Shumaker & Sieffert, P.A.

(57) ABSTRACT

A method discovers whether network interfaces associated with a device are capable of being channel bonded. In particular, each network interface associated with a device broadcasts a message on a network that other network interfaces can identify as having originated on the sending network interface. If a second network interface associated with the device receives a message and identifies the message as having originated on a first network interface associated with the same device, the first and second network interfaces can be channel bonded.

29 Claims, 2 Drawing Sheets

DETECTING NETWORK INTERFACES CAPABLE OF CHANNEL BONDING

TECHNICAL FIELD

The invention relates to computer networks, and, in particular, to discovering network topologies.

BACKGROUND

A network device may connect to one or more networks through one or more network interfaces. For example, a network device could have two Ethernet cards that are coupled to two separate Ethernets. If one or more of the network interfaces associated with the device connect to the same network, the device may "channel bond" the network interfaces. In particular, the network interfaces may be logically presented to applications executing on the device as a single interface. This allows the applications to utilize the bonded interface as a single interface when communicating with the network.

For instance, the network device could have two Ethernet cards that are coupled to the same Ethernet. When the device channel bonds two or more network interfaces, the device may increase sending speed by sending data onto the network through any of the channel bonded network interfaces. In addition, if one of the network interfaces fails or loses connectivity, the device can continue to send and receive data from the network through the remaining channel bonded network interfaces.

SUMMARY

In general, the invention is directed to techniques of determining whether network interfaces associated with a device may be channel bonded. In particular, each network interface associated with a device sends out a message onto a network. The message contains information associating the message with the network interface that sent the message. If a network interface receives a message sent from another network interface associated with the device, then the device knows that the two network interfaces connect to the same network, and therefore may be channel bonded.

In one embodiment, the invention is directed to a method that comprises broadcasting a message with a first network interface associated with a device onto a network coupled to the first network interface, wherein the message is identifiable as having been sent by the first network interface. The method also includes listening to a network coupled to a second network interface associated with the device for the message identifiable as having been sent by the first network interface. The method further comprises marking the first network interface and the second network interface as capable of being channel bonded when the second network interface receives the message identifiable as having been sent by the first network interface.

In another embodiment, the invention is directed to a system comprising a network capable of transmitting packets to network interfaces coupled to the network. In addition, the system comprises a first network interface that broadcasts a message on the network, wherein the message is identifiable as having been sent by the first network interface. The system further comprises a second network interface that listens to the network for the message identifiable as having been sent by the first network interface. The system also includes a network detection module that marks the first network interface and the second network interface as capable of being channel bonded when the second network interface receives the message identifiable as having been sent by the first network interface and the first network interface and the second network interface are associated with a single device.

In another embodiment, the invention is directed to a computer-readable medium comprising instructions for causing a processor to broadcast a message with a first network interface associated with a device onto a network coupled to the network interface, wherein the message is identifiable as having been sent by the first network interface. The medium also comprises instructions that cause the processor listen to a network with a second network interface associated with the device for the message identifiable as having been sent by the first network interface. In addition, the medium comprises instructions that cause the processor to mark the first network interface and the second network interface as capable of being channel bonded when the second network interface receives the message identifiable as having been sent by the first network interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
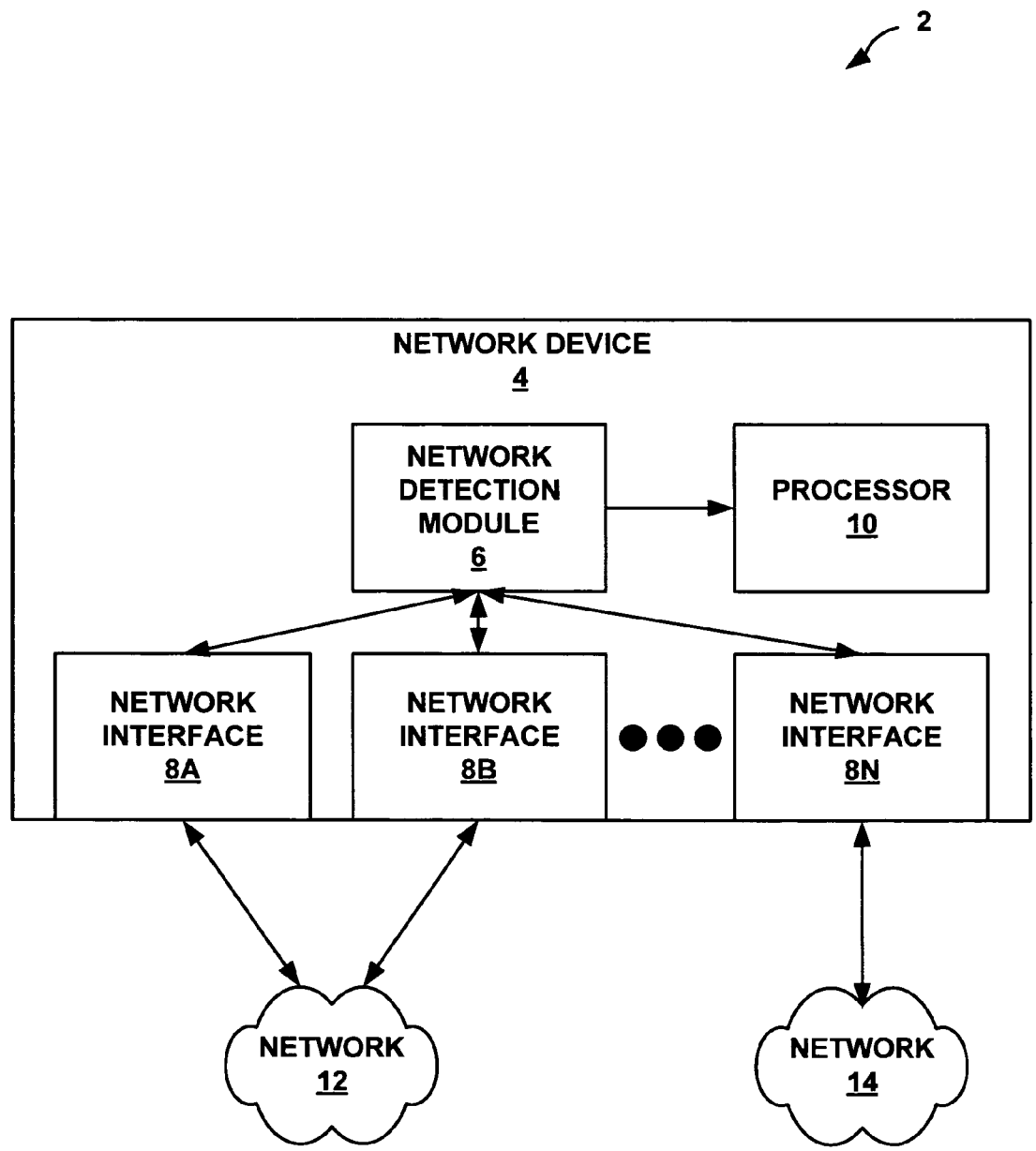
FIG. 1 is a block diagram illustrating an exemplary system in which a device employs channel bonding capability detection techniques.

FIG. 1 is a block diagram illustrating an exemplary system 2 in which a network device 4 employs the channel bonding capability detection techniques of this invention. Device 4 comprises a channel bondability detection module ("CBDM") 6, a series of network interfaces 8A through 8N (collectively network interfaces 8), and a processor 10. Network interfaces 8A and 8B connect to a first network 12 while network interface 8N connects to a second network 14. CBDM 6 applies the techniques described herein to determine whether any of network interfaces 8 connect to the same network. Networks 12 and 14 may be any network, such as an Ethernet network or a wireless network.

When processor 14 invokes CBDM 6, CBDM 6 begins a channel bonding capability detection process. CBDM 6 starts by discovering information about each of network interfaces 8. In particular, CBDM 6 collects a globally unique identifier for each of network interfaces 8. For instance, CBDM 6 may collect a Media Access Control ("MAC") address from network interfaces 8. In addition, CBDM 6 may collect a transmission speed from each of network interfaces 8.

Next, CBDM 6 instructs network interfaces 8 to broadcast a special self-identification message. In other words, network interfaces 8 send self-identification messages to all other network interfaces on the network. CBDM 6 may format the self-identification messages using the Address Resolution Protocol ("ARP"). In this embodiment, when creating a self-identification message, CBDM 6 sets both the sender protocol address and target protocol address fields of the ARP packet to zero. Under normal circumstances, the sender protocol address and the target protocol address represent Internet Protocol ("IP") addresses. In addition, CBDM 6 sets the sender hardware address of the ARP packet to the MAC address of the sending network interface 8. The MAC address makes the packet identifiable as having been sent by a particular network interface.

Next, network interfaces 8 listen for inbound self-identification messages. CBDM 6 periodically checks network interfaces 8 to determine whether network interfaces 8 have received self-identification messages. That is, CBDM 6 may check whether network interfaces 8 have received any ARP-formatted packets having a sender protocol address and a target protocol address of zero. If a network interface has received such a message, CBDM 6 checks the sender MAC address of the received self-identification message. If the sender MAC address belongs to one of network interfaces 8 associated with device 4, CBDM 6 concludes that the receiving network interface and the sending network interface connect to the same network, and therefore can be channel bonded.

For example, if network interface 8A broadcasts a self-identification message to all devices on network 12, network interface 8B would receive the self-identification message. CBDM 6 would therefore conclude that network interfaces 8A and 8B connect to the same network. However, because 8N connects to network 14 rather than network 12, network interfaces 8A and 8B would not receive a self-identification message sent by network interface 8N. Likewise, network interface 8N would not receive self-identification messages sent by network interfaces 8A and 8B. Accordingly, CBDM 6 concludes that network interfaces 8A and 8B are capable of being channel bonded to each other. In addition, CBDM 6 concludes that 8N cannot be channel bonded to either network interface 8A or 8B.

CBDM 6 continues to instruct network interfaces 8 to broadcast self-identification messages periodically until a timeout expires or until CBDM 6 marks all network interfaces associated with device 4 as capable of being channel bonded to one another. Sending multiple self-identification messages may be necessary if networks 12 or 14 drop one or more self-identification messages. After the timeout expires, CBDM 6 may compose a report listing which of network interfaces 8 may be channel bonded. CDDM 6 may then make the report available to processor 14 or another external module. For example, if network device 4 acts as a node in a distributed computing environment, CBDM 6 may make the report available to a control node of the distributed computing environment. The control node may then send instructions to processor 14 of device 4 to channel bond one or more bondable network interfaces.

The channel bondability detection techniques of this invention have several advantages. For example, the channel bondability detection techniques allow a user to determine whether network interfaces can be bonded without physically inspecting cables running into and out of various network interfaces. Detecting channel bondability by physical examination can be expensive and time consuming, especially when there are many devices present in a particular location. This problem could be especially acute for remote data centers and data warehouses where physical access is not feasible. Moreover, the techniques of this invention may not require any additional hardware and are simple to implement on a variety of network devices.

Figure 2:
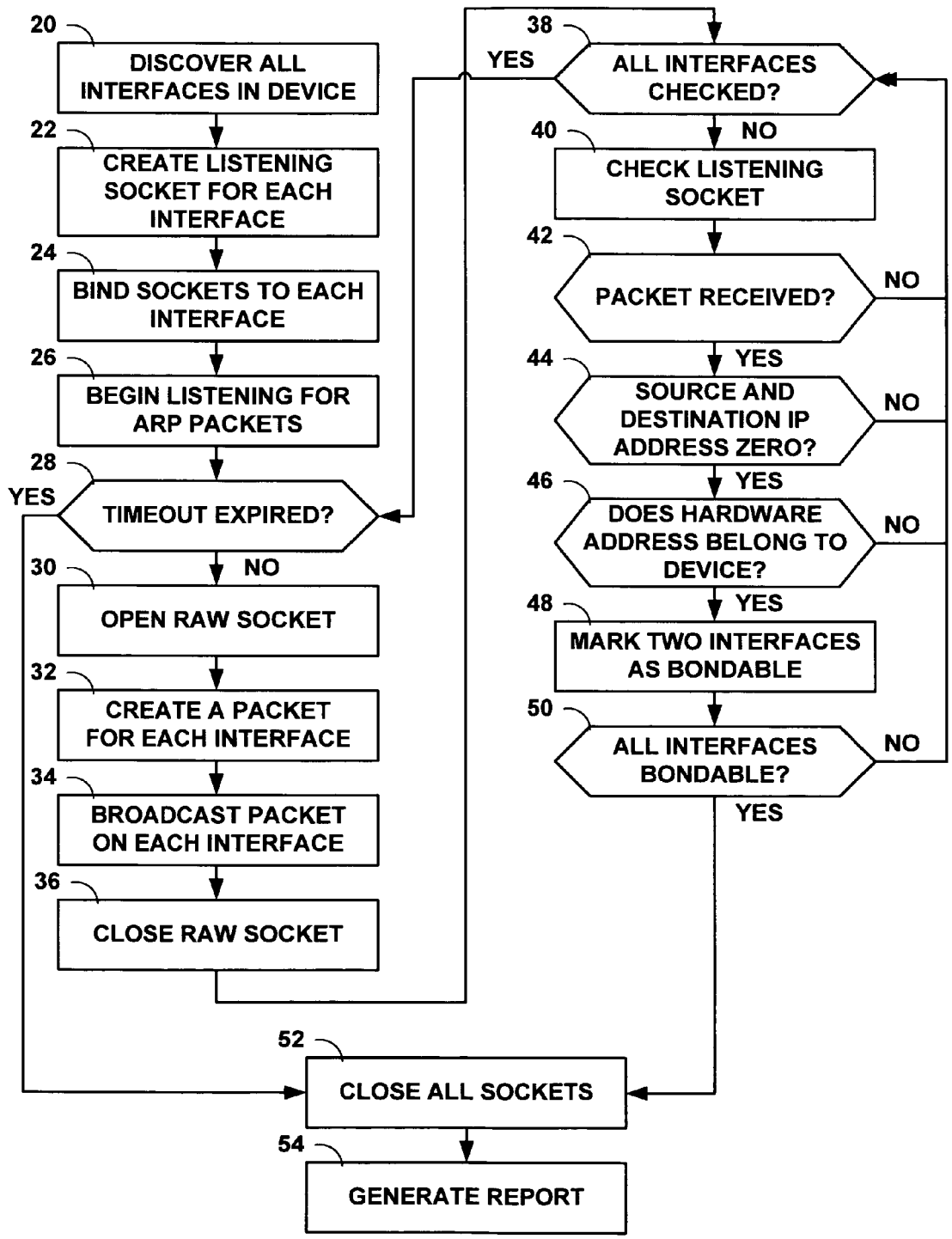
FIG. 2 is a flowchart illustrating an exemplary mode of operation for a device employing the channel bonding capability techniques.

FIG. 2 is a flowchart illustrating an exemplary mode of operation of CBDM 6 (FIG. 1). When processor 14 invokes CBDM 6, CBDM 6 discovers all network interfaces 8 associated with device 4 (20). That is, CBDM 6 determines how many network interfaces 8 are associated with device 4. In discovering network interfaces 8, CBDM 6 collects the MAC address and transmission speeds of network interfaces 8. In some systems, channel bonding is difficult or impossible when network interfaces 8 have differing transmission speeds.

After discovering network interfaces 8, CBDM 6 creates an ARP listening socket for each of network interfaces 8 (22). An ARP listening socket has the capacity to receive and temporarily store packets conforming to the ARP protocol. Next, CBDM 6 binds an ARP listening socket to each network interface (24). That is, CBDM 6 instructs network interfaces 8 where and how to temporarily store received packets conforming to the ARP protocol. Once CBDM 6 has bound an ARP listening socket to each of network interfaces 8, network interfaces 8 can begin listening for self-identification messages formatted as ARP packets (26).

CBDM 6 then checks whether a timeout has expired (28). CBDM 6 may use a timeout of 45 seconds when networks 12 and 14 contain switches that use spanning trees. The switches may take up to 30 seconds to build a spanning tree after receiving a packet from a new sender. Therefore, CBDM 6 waits just long enough to ensure that network interfaces 8 can receive self-identification messages when the switches take the maximum allowed time to build the spanning trees.

To send a round of self-identification messages, CBDM 6 first opens a raw socket (30). The raw socket allows CBDM 6 to build an ARP-formatted packet for each of network interfaces 8 (32). Specifically, CBDM 6 creates an ARP-formatted self-identification message with the sender protocol address field and the target protocol address fields set to zero. In addition, CBDM 6 sets the sender hardware address field of the ARP-formatted self-identification message to the MAC addresses of interfaces 8. After creating the ARP-formatted self-identification messages, CBDM 6 instructs network interfaces 8 to send the ARP-formatted self-identification messages (34). CBDM 6 then completes the round of self-identification messages by closing the raw socket (36).

CBDM 6 then determines whether all network interfaces 8 have been checked after sending the self-identification messages (38). If CBDM 6 has checked all network interfaces 8, CBDM 6 loops back and checks whether the timeout has expired (28). CBDM 6 may then send out another round of self-identification messages (30-36). On the other hand, if CBDM 6 has not yet checked all network interfaces 8 after sending a round of self-identification messages, CBDM 6 checks an ARP listening socket bound to a network interface to determine whether the ARP listening socket has received a packet (40).

If the ARP listening socket has received a packet (42), CBDM 6 checks whether the packet contains a sender protocol address and a target protocol address fields equal to zero (44). If the sender protocol address or target protocol address fields do not equal zero (44), CBDM 6 goes back and checks whether CBDM 6 has checked all network interfaces 8 (38). On the other hand, if both the sender protocol address and the target protocol address fields of the received packet equal zero (44), CBDM 6 checks whether the sender hardware address (i.e., MAC address) is one that belongs to a network interface associated with device 4 (46). If the sender hardware address is not one that belongs to a network interface associated with device 4 (46), CBDM 6 goes back and checks whether CBDM 6 has checked all network interfaces 8 (38). However, if the sender hardware address field of the packet belongs to a network interface associated with device 4 (46), CBDM 6 marks the receiving network interface and the network interface having a MAC address equal to the sender hardware address field as being channel bondable (48).

After marking two network interfaces as channel bondable, CBDM 6 checks whether all network interfaces 8 associated with device 4 are marked as channel bondable (50). If CBDM 6 has not marked all network interfaces 8 as channel bondable, CBDM 6 loops back and checks whether CBDM 6 has checked all network interfaces 8 (38). If CBDM 6 has marked all network interfaces 8 as channel bondable, waiting until the timeout expires is pointless, so CBDM 6 closes the ARP listening sockets on network interfaces 8 (52). After closing the ARP listening sockets, CBDM 6 completes the bondability detection process by generating an externally available report listing which network interfaces 8 associated with device 4 are capable of being channel bonded (54). Because transmission speed may be a second factor in determining whether network interfaces 8 may be channel bonded, the report may also list the transmission speeds of the network interfaces. Subsequently, processor 14 may channel bond a first and a second network interface which CBDM 6 marked as capable of channel bonding.

Various embodiments of the invention have been described. For example, a system has been described in which a network device with multiple network interfaces uses the ARP protocol to send packets on Ethernet networks. Nevertheless, various modifications may be made without departing from the spirit and scope of the invention. For example, the network device may use another protocol or another type of network such as token ring or Wireless Fidelity ("Wi-Fi"). Moreover, this system could be coupled to a wide variety of other systems including, but not limited to, distributed computing environments (e.g., Beowulf clusters, etc.), and devices for home and enterprise networks. These and other embodiments are within the scope of the following claims.

The invention claimed is:

1. A method comprising:
broadcasting a message formatted as an Address Resolution Protocol ("ARP") packet with a first network interface associated with a device onto a network coupled to the first network interface, wherein the message is identifiable as having been sent by the first network interface, wherein a target protocol address field and a sender protocol address field of the ARP packet are zero, and wherein a sender hardware address field of the ARP packet is a hardware address of the first network interface;
listening to a network coupled to a second network interface associated with the device for the message identifiable as having been sent by the first network interface; and
marking the first network interface and the second network interface as capable of being channel bonded when the second network interface receives the message identifiable as having been sent by the first network interface.

2. The method of claim 1, wherein the network is a layer 2 network.

3. The method of claim 1, wherein the first network interface and the second network interface have the same transmission speed.

4. The method of claim 1, further comprising channel bonding the first and second network interfaces when the first and second network interfaces are marked as capable of channel bonding.

5. The method of claim 1, further comprising generating an externally available report listing network interfaces associated with the device that are capable of being channel bonded.

6. The method of claim 1, wherein the hardware address is a Media Access Control ("MAC") address.

7. The method of claim 1, wherein the target protocol address and the sender protocol address fields represent Internet Protocol ("IP") addresses.

8. The method of claim 1, further comprising broadcasting the message periodically until a timeout expires.

9. The method of claim 1, further comprising broadcasting the message periodically until all network interfaces associated with the device are marked as capable of being channel bonded to one another.

10. The method of claim 1, wherein the device is a node in a distributed computing environment.

11. The method of claim 10, further comprising receiving instructions from a control node of the distributed computing environment to channel bond two or more of the network interfaces marked as capable of being channel bonded.

12. The method of claim 1, further comprising discovering each network interface associated with the device.

13. The method of claim 1, wherein the network is an Ethernet network or a wireless network.

14. A system comprising:
a network capable of transmitting packets to network interfaces coupled to the network;
a first network interface that broadcasts a message on the network, wherein the message is identifiable as having been sent by the first network interface, wherein the first network interface formats the message as an Address Resolution Protocol ("ARP") packet, wherein a target protocol address field and a sender protocol address field of the ARP-formatted packet are zero, and wherein a sender hardware address field of the ARP-formatted packet is a hardware address of the first network interface; and
a second network interface that listens to the network for the message identifiable as having been sent by the first network interface; and
a network detection module that marks the first network interface and the second network interface as capable of being channel bonded when the second network interface receives the message identifiable as having been sent by the first network interface and the first network interface and the second network interface are associated with a single device.

15. The system of claim 14, wherein the network is a layer 2 network.

16. The system of claim 14, wherein the first network interface and the second network interface have the same speed.

17. The system of claim 14, wherein the device channel bonds the first network interface and the second network interface when the network detection module marks the first network interface and the second network interface as capable of being channel bonded.

18. The system of claim 14, wherein the network detection module generates an externally available report listing network interfaces associated with the device that are capable of being channel bonded.

19. The system of claim 14, wherein the hardware address is a Media Access Control ("MAC") address.

20. The system of claim 14, wherein the target protocol address and the sender protocol address fields represent Internet Protocol ("IP") addresses.

21. The system of claim 14, wherein the first network interface broadcasts the message periodically until a timeout expires.

22. The system of claim 14, wherein the first network interface broadcasts the message periodically until the network detection module detects that all network interfaces associated with the device are capable of being channel bonded to one another.

23. The system of claim 14, wherein the device is a node in a distributed computing environment.

24. The system of claim 23, wherein the network detection module receives instructions from a control node of the distributed computing environment to channel bond two or more of the network interfaces marked as capable of being channel bonded.

25. The system of claim 14, wherein the network is an Ethernet network or a wireless network.

26. A computer-readable medium comprising instructions for causing a processor to:

broadcast a message formatted as an Address Resolution Protocol ("ARP") packet with a first network interface associated with a device onto a network coupled to the network interface, wherein the message is identifiable as having been sent by the first network interface, wherein a target protocol address field and a sender protocol address field of the ARP packet are zero, and wherein a sender hardware address field of the ARP packet is a hardware address of the first network interface;

listen to a network with a second network interface associated with the device for the message identifiable as having been sent by the first network interface; and mark the first network interface and the second network interface as capable of being channel bonded when the second network interface receives the message identifiable as having been sent by the first network interface.

27. The computer-readable medium of claim 26, wherein the network is an Ethernet network.

28. The computer-readable medium of claim 26, further comprising instructions that cause the processor to channel bond the first and second network interfaces when the first and second network interfaces are marked as capable of channel bonding.

29. The computer-readable medium of claim 26, further comprising instructions that cause the processor to generate an externally available report listing network interfaces associated with the device that are capable of being channel bonded.

* * * * *

UNITED STATES PATENT AND TRADEMARK OFFICE
CERTIFICATE OF CORRECTION

PATENT NO.       : 7,609,642 B2                                              Page 1 of 1
APPLICATION NO. : 11/224441
DATED            : October 27, 2009
INVENTOR(S)      : Glenn W. Myers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twelfth Day of October, 2010

David J. Kappos
*Director of the United States Patent and Trademark Office*